Sept. 22, 1953   G. N. WASHBURN   2,652,807
DEVICE FOR THE TRANSPORTATION AND STORAGE OF LIVE FISH
Filed May 2, 1951
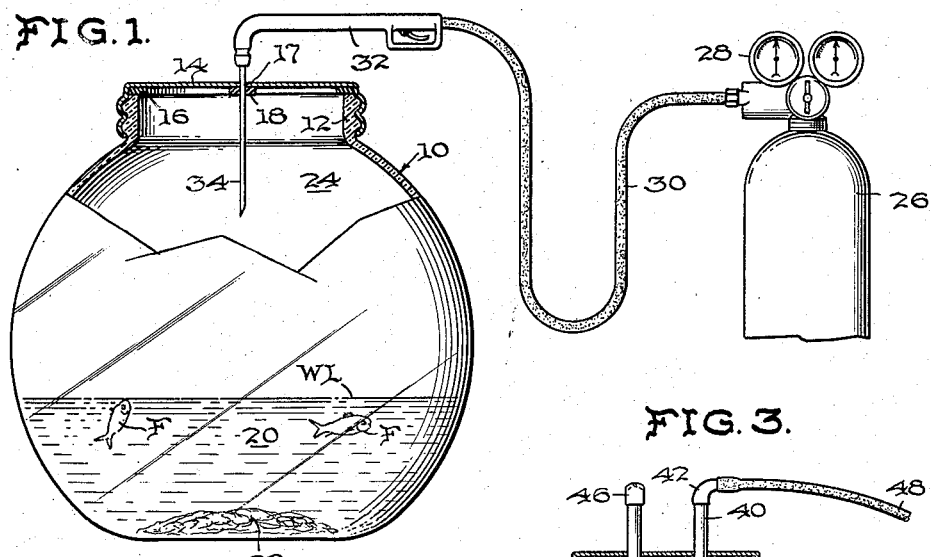
FIG. 1.
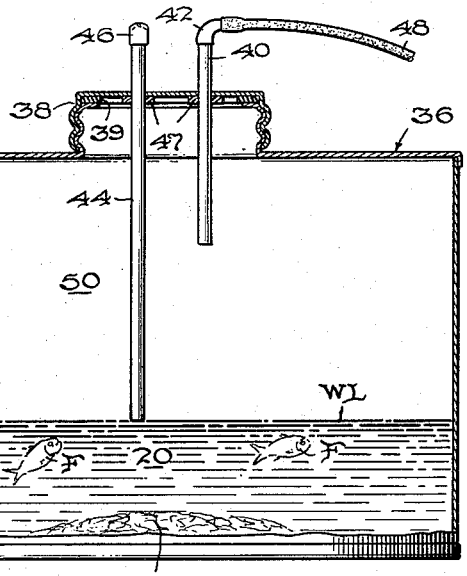
FIG. 3.
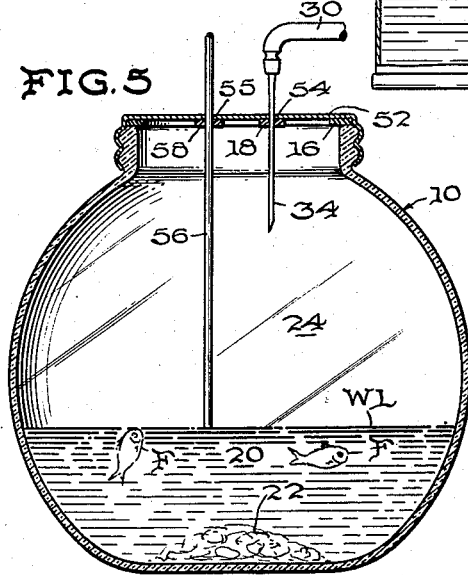
FIG. 2.
FIG. 5
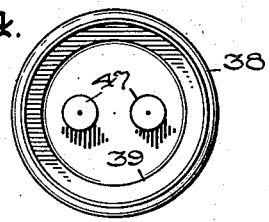
FIG. 4.
INVENTOR.
George N. Washburn
BY Leech + Radue
Attorneys Patented Sept. 22, 1953

2,652,807

UNITED STATES PATENT OFFICE 2,652,807

DEVICE FOR THE TRANSPORTATION AND STORAGE OF LIVE FISH

George N. Washburn, Stoutland, Mo., assignor to Ozark Fisheries, Inc., Stoutland, Mo.

Application May 2, 1951, Serial No. 224,193

4 Claims. (Cl. 119—3)

This invention relates to improvements in the transportation and storage of live fish, whereby such fish may be kept alive and in a healthy and thriving condition for a very considerable period of time during shipment, storage, or display.

Prior to this invention, no practical means had been found by which live fish may be safely carried over long distances without loss either in transit or upon arrival at the point of destination. Large quantities of live fish are in demand for food, for ornaments, for fish culture, and for sporting purposes as live bait fish. The common method has been to place the live fish in cans of water or other containers having perforated openings for the admission of air, but this method is generally ineffectual because in many instances some, if not all, of the fish perish while being shipped to their destination, or are in such a weakened condition upon arrival as to die soon afterward. More complicated containers having accompanying apparatus for keeping the water fresh have been used, but they are expensive, cumbersome, and do not meet the basic requirements for simple and effective means for transporting live fish substantial distances with the assurance that they will be in as good condition upon arrival as when shipped.

It is, therefore, the general object of this invention to provide a novel method and means for transporting and storing live fish and keeping them alive and in a healthy condition for considerable periods of time. A further and related object resides in the provision of a novel method of preparing live fish for such shipping and storage.

A further and particular object of this invention is to provide a method that will simply and economically maintain and insure a healthful environment during the period of transporting and storing, without danger to, or interference with, the surroundings in which they are kept.

A further and particular object resides in the incorporation in an oxygen containing storage medium of a metabolic agent that will retard the respiration rate of the fish and thus extend the effective period of the oxygen atmosphere.

These and other objects will be more apparent from the following detailed description of the invention and preferred modes in which it may be employed.

One of the most widely transported species of fish in this country is the goldfish. As this fish is variously used as a bait minnow, and sold in stores for household pets, the problems of transporting, storing and displaying are constantly causing difficulties to the retail dealer. In view of the fact that this species figures largely in interstate shipment, and is widely used as a test animal in research laboratories, it has been found extremely useful for experimental study in connection with the present invention. It will be appreciated, however, that the scope of this invention is not so limited, and that it is applicable to the shipment and storage of all other species which enter regular channels of traffic.

The nature of the problem, and the factors involved, will now be explained. Depending upon the species, fish require a minimum of about four parts per million of dissolved oxygen in the water to assure a normal living habitat. When this oxygen content is reduced, the fish are invariably affected either directly or indirectly, resulting in death immediately or at a later date, or at least causing a sufficient weakening of the fish to bring about unfavorable morphological changes. Since the simple shipping containers previously used fail to provide any sure means of aeration, there is always the chance that unfavorable oxygen conditions will develop.

Another very important factor in the transportation of fish is the chemical nature of the water used. Water that is chemically and physically suitable for normal fish at the beginning of the transport operation can easily become so contaminated with organic toxin, resulting from the bacterial breakdown of fecal waste, that the carrying medium becomes poisonous to the fish. Fish culturists engaged in the transfer of fish have recognized this factor and have developed various techniques for counteracting the condition. However, the provisions for correction are either too bulky or costly to permit of economical use. The simplest standard procedure in use at present is merely to change the water at set time intervals. However, this practice is not always desirable, and further, conformance is not always possible. Where suitable water is not available during transit, the operator must omit the change, or if he does change, there is always the chance that the change may be more harmful than beneficial, since the chemical nature of the water used may be so foreign to the fish that they will succumb to chemical shock.

The novel method and procedures of this invention will go a long way toward elimination of the many difficulties encountered during the transfer and temporary storage of live fish. In a general way, the method for transporting and temporary storage of live fish involves placing a given quantity of fish within a sealed vessel or zone containing water, an adequate reserve of oxygen, and a combination of chemical reagents capable of bringing about a continual purification. This method is simple to perform, economical in operation, and very efficient when compared to other modes of transferring live fish. This will be understood from the following explanation of the facts concerning a preferred method for transporting and storing live fish in sealed containers.

It is basically necessary to provide fish with chemically suitable water. Nature accomplishes this by the ground water filtration system. Rain water permeates through the soil, which in turn removes many organic substances and adds certain basic salts. When this water later is brought to the surface, either by pump or free flowing, it is found suitable for normal fish life. The present invention recognizes this factor as essential to fish life and provides a constantly operating filtration system to simulate that occurring in nature.

First, there must be added to the transporting water, definite quantities of activated carbon. Such carbon has an affinity for many organic compounds frequently encountered in bacterial fish fecal breakdown, namely ammonia, amino acids, and sulphates. The activated carbon is specific for the adsorption of certain organic compounds. An additional reagent known by the proprietary name "Permutit" is added to assist in further ammonia removal. "Permutit" is a synthetic resinous compound having the formula: $Na_2O.Al_2O_3.2SiO_2.6H_2O$. A relatively small but predetermined amount is used. This compound is useful for its sulphate affinity.

Further purification of the transporting water is attained by the addition of small amounts of calcium carbonate ($CaCO_3$), which serves the purpose of reducing the free carbondioxide ($CO_2$) which is harmful to fish life in excess quantities.

To counteract the effect of the total mineral hardness, the calcium carbonate and the calcium bicarbonate ($CaHCO_3$) formed, are reduced by the addition of a small quantity of magnesium sulphate ($MgSO_4$).

While as will be pointed out subsequently, reagents other than those specified can in some instances be used, the ones set forth in combination have been found to operate very satisfactorily and have been found to be non-toxic to the fish, as well as very simple and safe to handle.

The actual filtering system is provided simply by placing these reagents in the water used to carry the fish and depending upon the agitation of the containing vessel, the movement of the fish therein, or both, to create currents of water passing through the chemical filter bed, thus allowing the waste organic substance to be adsorbed by or to combine with the reagents used as the filter bed.

Another factor essential to fish life is the provision of an adequate supply of dissolved oxygen. In nature, this is accomplised either by waste coming into contact with the atmosphere or by the photosynthetic reaction of green (oxygen producing) plants. The amount of dissolved oxygen present in the water depends upon the extent of surface contact of the water with the atmosphere, or the quantity of the green plants present. Where the conditions described are inadequate for supplying ample oxygen for fish life, mechanical means of agitation must be used if the water is to be suitable for fish maintenance.

In the method of this invention, the dissolved oxygen is provided in a very simple manner. The oxygen for the fish is stored in a gaseous form within the container, under pressures ranging from atmospheric to 25 pounds per square inch gauge. The oxygen gas is thus readily available and can be provided in ample quantities to insure a safe reserve for a moderate period of time. A pure atmosphere of oxygen will provide a medium whereby the solubility of oxygen is increased five times over that of a normal air atmosphere. Since the oxygen is stored under pressure, the availability to the captive fish becomes greater, the solubility of oxygen being directly proportionate to the pressure exerted within the container on the interface between the oxygen gas and the water. By suitable regulation of the oxygen pressure stored within the container, it is possible to accelerate or retard the rate of transmission of the oxygen into the water. Further, by specific design changes in the container so as to increase or decrease the surface area of the water, the rate of flow of oxygen entering the water in a dissolved state can be additionally adjusted.

One other important factor that was found to materially improve the method was the introduction of a non-harmful chemical agent which is capable of retarding the metabolic rate of the live fishes being transported. Urethane, $$(NH_2-CO_2-C_2-H_5)$$

when present in predetermined small quantities, safely slows down the respiration rate by one-half over normal pulsations, and it was discovered that in this manner the fish required only about one-half the oxygen formerly used without the metabolic agent.

The following is an example of a preferred method of practicing the invention disclosed:

For each 1000 cubic centimeters of water in a partially filled container vessel, the following are added in the amounts indicated:

| | |
|---|---|
| Activated carbon | 10 to 40 grams |
| "Permutit," $Na_2O.Al_2O_3.2SiO_2.6H_2O$ (ammonia removing synthetic resin) | 500 to 2,000 milligrams |
| Magnesium sulfate | Up to 10 milligrams |
| Calcium carbonate | Up to 5 grams |
| Urethane | 1.25 to 5 grams |

The fish are added before the urethane metabolic agent, the space unoccupied by the water is filled with gaseous oxygen under pressure, the air being displaced, and the containing vessel is finally sealed.

A possible substitute for the activated carbon is natural zeolite, which would also act physically to adsorb the ammonia. It is also possible that the chemical reaction of magnesium phosphate $(Mg_3PO_4)_2.4H_2O$ with ammonium $NH_4$, could be used to serve the purpose of the activated carbon, but in a different way.

Where extremely short periods of storage are involved, the calcium carbonate and the magnesium sulphate may be omitted.

Ether (U. S. P.) ($C_2H_5$)O may be substituted for urethane.

While the supplying of gaseous oxygen under pressure to the space unoccupied by the water in the containing vessel is considered best, any other physical or chemical procedure that will result in an equivalent supply under pressure in this space may be employed, providing that it is not inimical to the fish.

The containing vessel should be made of a material or materials which are not readily oxidizable, are non-toxic to fish, or of such materials as can be coated with an inert substance capable of sealing off the container material from the fish and chemicals within. Examples are vessels made of glass, plastics, aluminum, wood, or other similar materials.

The container must be constructed of material capable of withstanding an outward pressure of 25 pounds per square inch, and it must have an opening of sufficient size for insertion of the fish, filtering material and chemicals. Physically the container should be designed to provide certain fixed ratios between the volume of water, the surface area of the water, and the volume of the oxygen gas space.

Using goldfish as test animals, the following very satisfactory results have been attained with the method and procedures of this invention.

At water temperatures within the container of from 65 to 75 degrees F., from 50 to 75, 1½ to 2½ inch goldfish have been kept in excellent condition for a period of six days in a medium of one thousand cubic centimeters of water in a four quart glass container, sustaining an oxygen pressure of 9 pounds per square inch gauge.

In a metal pressure container carrying an oxygen pressure of 10 pounds per square inch gauge, 200 small goldfish have been transported in a medium of 8 pounds of water for a distance of 800 miles, and left in storage four days without any ill effects.

In small glass jars ranging from 12 to 24 liquid ounces in capacity, 2 to 4 fish in each jar have been similarly kept in excellent condition for periods ranging from two to three weeks.

By this method goldfish have been stored in containers at pressures ranging from 5 to 25 pounds per square inch gauge for periods up to 90 days without ill effects. The same fish have been processed over and over again as much as five times for individual fish without any apparent harm to the test animals.

A comparison of the presently disclosed method for the transfer and temporary storage of live fish with other methods in use today, shows the following outstanding advantages. It is found that with the pressure sealed method of this invention, at least 1 pound of fish can be shipped for every 8 pounds of water, while in the open container (now widely used), about 29 pounds of water are needed for carrying 1 pound of fish. Even for a short time storage, the same minimum of 29 pounds of water per pound of fish was required. With the present method, and a short storage time (24 hours en route), at least 1½ pounds of fish (300 individuals) can be shipped for every 8 pounds of water. It will thus be understood that with the prior and conventional methods of open container shipment, the distance and the time element play only a small role in varying the poundage ratio of fish and water. The reason for this unfavorable weight factor is found in the fact that water within the open container is incapable of absorbing oxygen at a rate demanded by an increased poundage of fish. The small goldfish being specifically considered, each require from about ⅓ to ½ cubic centimeter of oxygen per hour within a temperature range from 65 to 70 degrees F. Twenty-nine pounds of water at this temperature range would have about 90 cubic centimeters of dissolved oxygen if the water was completely saturated with oxygen. Two hundred of these small fish would require at least between 60 and 70 cubic centimeters of oxygen per hour to sustain life. It will be apparent that in order to increase the carrying capacity of the water, a marked agitation of the container would be necessary. With oxygen pressurized sealed containers, the solubility of oxygen is greatly increased, so that at the temperature range mentioned, 8 pounds of water under 10 pounds pressure would contain on a theoretical basis about 240 cubic centimeters of dissolved oxygen. For short periods of time, if a larger quantity of fish is crowded into the same amount of water, there will still be an excess of available oxygen ready to supply the heavy demand. Furthermore, such an overload demand can be met for a considerable length of time by allowing a substantial increase in pressure of the oxygen in storage.

The great saving in transportation charges represents a very important economic factor attributable to the method of this invention.

The sealed, pressurized method of this invention has a very great advantage over other means of transporting and storing fish in the long time element provided. When moderate quantities of fish are stored, they will remain in excellent health for a period of two or three weeks without any attention. With open containers, continual attention must be given to the fish to assure that the water is not contaminated by fecal waste, or being lost by evaporation. There is also the problem of splashing or leakage of water, with the open type containers. A sealed vessel can be be packed with or beside other merchandise and it can be disposed in any position. Obviously, the open container must be maintained in an upright position and kept away from other goods which could be damaged by splashing water.

When fish are received in an open type container, they must be transferred to an aquarium for further storage because they would soon die if no additional provision were made to provide a more favorable environment. Aquariums or holding tanks of the kind required vary in cost from one hundred to several hundred dollars each, depending on the materials of construction and the holding capacity. Such overhead cost is an important problem to the small storage operator. In fact, it tends to restrict the retailer of goldfish to densely populated areas, or to areas where heavy demand exists. Sometimes the areas of heavy demand cannot be serviced anyway because the water available is unfavorable to fish life.

The method of this invention eliminates many of the practical problems outlined. It is not necessary for the retailer of pressure packaged fish to install expensive holding equipment. All that is required is to keep the fish in a cool place while in temporary storage. A small business is possible because small numbers of fish can be packaged and consigned. The business becomes independent of the population of the area or the existence of favorable water conditions for natural storage. Even roadside establishments such as gas stations, taverns, and novelty shops will suffice.

This invention makes the use of small transparent containers or vessels entirely feasible. By way of example, two goldfish in each of 30 twelve-ounce jars pressurized and sealed in accordance with the method of this invention, have been shipped hundreds of miles, and when the jars were opened after two weeks of additional storage, all of the fish were found to be alive and in healthy condition. Open containers cannot possibly be of such small nature and remain practical to use.

Besides the expense of storage, the labor expense of handling and selling can be greatly reduced by selling a few fish in the small glass or other transparent material containers in which they have been shipped under pressurized conditions.

The method of this invention is also of great advantage with regards to changing temperature conditions during storage and shipment. Goldfish transported by the previous conventional means must be supplied with generous quantities of ice when the air temperature rises consistently above 75 degrees F. Two reasons make such additional and expensive treatment necessary: At temperatures above the 75 degree point, there is a marked increase in the metabolic rate of goldfish, this increase being proportionate to the increase in temperature. At higher metabolic rates, the fish require more oxygen than formerly, and in addition the rate of body discharge is likewise increased. As the water temperature increases, the solubility of oxygen therein decreases proportionately. This actually reduces the amount of oxygen available for the fish, when more is in fact demanded. The increase in rate of body discharge calls for additional oxidation and reduction of organic waste which further taxes the available oxygen. In a storage container that is sealed and using the pressurized method of this invention, all of the above unfavorable factors are at work at higher temperatures, but in a greatly modified form. The oxygen supply factor can be ignored since there is an abundant supply available at all times. Since the metabolic reaction of the fish within the container has been chemically conditioned, only a small increase will take place. Although the biological oxygen demand is accelerated, the presence of chemical agents within the container to adsorb and combine with the organic waste produced, greatly reduce this factor of demand. It is desirable however, when transporting or storing fish under the present pressurized method, to keep the temperature within the container at a level below 75 degrees F. if possible, thus permitting a longer time of survival for the fish contained. No such precaution as this is necessary however, when the fish are to be held in a sealed condition for only two or three days.

The details of the method which has been explained, as well as the nature of the article of manufacture and sale represented by sealed pressurized containers of fish will be more fully understood from the accompanying drawings forming a part of this application, and in which:

Fig. 1 is a side elevation of a shipping or storing container partially sectioned and shown in association with an apparatus for supplying oxygen;

Fig. 2 is a bottom plan view of the closure member for the container of Fig. 1;

Fig. 3 is a partially sectioned side elevation view showing a modified form of sealed vessel and the means for supplying it with oxygen;

Fig. 4 is a bottom plan view of the closure element of the vessel of Fig. 3;

Fig. 5 is a partially sectioned side elevation of a container similar to that of Fig. 1, but having different means for supplying oxygen.

As shown in Fig. 1, the pressurized container comprises a bowl 10 of glass or transparent plastic material having a threaded neck 12 receiving a screw closure cap 14. A seal gasket 16 is interposed between the closure cap 14 and the lip of the neck 12. It will be particularly noted that the closure cap 14 is formed with a small central opening 17, closed on the underside by a gum rubber sealing disc 18 adhesively secured in place.

The bowl 10 is partially filled with water to the water-line WL. The various solid treating substances added in accordance with the previous description are indicated generally as by the reference numeral 22. The space between the waterline WL and the closure cap 14 is identified as oxygen space 24.

After the treating substance 22 and fish F have been added, the metabolic agent will be included, water will be added to fill the bowl 10 and the closure cap 14 will be screwed in place. The cap 14 will be screwed down tightly but not in an airtight relation, and the bowl 10 will be inverted. Oxygen is supplied from a conventional oxygen tank 26 having a pressure gauge 28 and connected by a line 30 including a hand valve 32, to a small tubular member 34 such as a No. 20 hypodermic needle slightly modified. The needle 34 enters the bowl 10 by puncturing the sealing disc 18. At first oxygen will be supplied from the tank 26 at a pressure sufficient only for forcing the desired amount of water from the container and replacing this water with gaseous oxygen. When the desired water level, WL, has been attained, the container lid is fixed tightly in an air sealed condition by additional turning, and then additional oxygen is admitted until a desired predetermined pressure is attained as shown by the gauge 28 and controlled by the hand valve 32. The oxygen needle 34 is then withdrawn from the sealing disc 18 and the closure cap 14. The punctured hole in the disc 18 automatically seals by the action of the outward thrust of the gum rubber disc towards the opening 17 in the closure cap or lid 14. The fish within the container are now processed and ready for transporting, storage or display.

In addition to being able to withstand an outward pressure of 25 pounds per square inch, the sealed container or bowl 10 must be designed so that certain fixed ratios exist between the volume of water, surface area of the water, and the volume of the oxygen gas.

For every 1000 cubic centimeters of water stored within the container 10, a storage space for 2800 cubic centimeters of gaseous oxygen at 760 millimeters pressure will be made available. In addition, the 1000 cubic centimeter unit of water should have a surface area of 28 square inches in contact with the gaseous oxygen. Using 1000 cubic centimeters of water as a basis for computation, there should be added the reagents specified in the example previously given and in the quantities indicated. For each one-quarter pound of small goldfish or other species of similar habitat, a 1000 cubic centimeter unit of water and proportioned amounts of chemical substances and other agents are required. One-quarter pound corresponds roughly to about 50 fish ranging in length from 1½ to 2½ inches each.

Fig. 3 illustrates a large cylindrical storage container 36 which may be made of metal. The top end opening of the container 36 is covered by a screw cap closure member 38 provided with a sealing gasket 39 on its under-peripheral edge in the manner described generally for Fig. 1. The cap 38 is provided with an oxygen intake stem or pipe 40 having a valve 42 of conventional construction. It is also provided with an oxygen bleeder pipe or stem 44 depending a greater distance into the container 36. The upper end of the bleeder stem 44 is closed by a manually operable valve cap 46 also of conventional construction. The stems 40 and 44 are permanent parts of the closure cap 36 in which they are sealed by means such as the discs 47.

After the required amount of water reagents, fish and metabolic agent are in place, the container 36 is then completely filled with additional water and the screw cap 38 is turned to an airtight position. The bleeder stem valve cap 46 is removed and an oxygen intake line or hose 48 from the oxygen tank 26 is joined to the oxygen intake valve 42. Oxygen is then admitted under suitable pressure to force the water from the container through the bleeder valve stem 44 until the desired amount of water has been withdrawn and a suitable oxygen space 50 has been provided. At this time the bleeder valve cap 46 is replaced and the admission of oxygen is continued until the required pressure is attained as shown by the pressure gauge 28.

Upon disconnecting the oxygen line 48 from the container and closing valve 42, the fish are completely processed and ready for shipment and storage or display.

The container and filling procedure illustrated in Fig. 5 differ only slightly from that shown and explained with respect to Fig. 1. In Fig. 5 the bowl 10 of glass or other transparent material has a screw closure cap 52 threaded on its neck 12 and sealed by a gasket 16 engaging the underside of the cap and the lip of the neck as shown.

As soon as the bowl has been initially supplied with water, chemical material, fish, and metabolic agent, and finally additional water, the cap or lid 52 is turned to an airtight position. The cap 52 is formed with an opening 54 for receiving the oxygen needle 34 and a spaced opening 55 for receiving a bleeder needle 56. The oxygen needle 34 is passed through a sealing disc 18 adhesively secured to the underside of the cap 52 in the same manner described for Fig. 1. The bleeder needle 56 which extends much further into the bowl 10 than the oxygen needle 34 is similarly sealed by a gum rubber disc 58 secured to the underside of the cap 52 over the opening 55 by adhesive means.

The depth of the bleeder needle 56 determines the waterline WL of the air space. When oxygen under pressure is admitted through the line 30 to the needle 34, water will be displaced from the container through the bleeder needle 56. When the desired amount of water has been displaced, the bleeder needle 56 will be withdrawn from the vessel and the opening 55 sealed automatically by the disc 58. Oxygen under pressure will continue to flow into the space 24 above the waterline WL until the desired pressure as shown by pressure gauge 28 has been attained. The sealing disc 18 will automatically close the opening 54 in the manner previously described after the oxygen needle 34 is withdrawn.

With the oxygen needle 34 removed, and the container bowl 10 entirely sealed, the live fish are processed and ready for shipping and storage.

The only essential difference between the apparatus and procedure of Figs. 1 and 5, is the addition of the bleeder needle 56 in Fig. 5 which makes for more convenient removal of the undesired water without inverting the bowl-like container 10.

The term "water" as used herein is to be interpreted as meaning fresh water as distinguished from sea water.

Where reference is made in the specification and claims to "live fish," "fish" is to be construed as meaning non-crustacean fish of which gold fish and bait minnows are examples.

While details and examples have been supplied in order to provide a full disclosure of the preferred modes of practicing this invention, it will be understood that variations can be made in the combination of chemical materials, the method of preparing the storage vessels and contents for shipment, and the containers themselves, without departing from the inventive principles set forth and the scope of the appended claims.

Having thus described my invention, what I claim as novel and desire to secure by Letters Patent of the United States, is:

1. As an article of manufacture and sale, the combination comprising a sealed vessel filled only partially with fresh water and containing: live fish, a water filtering mixture including activated carbon, a metabolic agent selected from the group consisting of urethane and ether, and gaseous oxygen in the space unoccupied by the water.

2. As an article of manufacture and sale, the combination comprising a sealed vessel filled only partially with fresh water and containing: live fish; a small amount of activated carbon for filtering the water; a relatively smaller amount of a compound selected from the group consisting of urethane and ether for reducing the respiration rate of the fish; and gaseous oxygen under at least atmospheric pressure in the space unoccupied by the water.

3. As an article of manufacture and sale, the combination comprising a sealed transparent vessel having a removable top; fresh water only partially filling the vessel; live goldfish in the water; a filtering mixture including activated carbon, an ammonia removing synthetic resin, calcium carbonate, and magnesium sulfate in the water; urethane in the water for reducing the respiration rate of the goldfish; and gaseous oxygen under superatmospheric pressure in the vessel space unoccupied by the water.

4. As an article of manufacture and sale, the combination comprising a sealed vessel filled only partially by fresh water and containing: live fish; a filtering mixture including per 1,000 cubic centimeters of water: 10 to 40 grams of activated carbon, 500 to 2,000 milligrams of an ammonia removing compound having the formula $$Na_2O.Al_2O_3.2SiO_2.6H_2O$$

up to 5 grams of calcium carbonate, and up to 10 milligrams magnesium sulfate; 1.25 to 5.0 grams of urethane per 1,000 cubic centimeters of water for reducing the respiration rate of the fish; and gaseous oxygen under superatmospheric pressure in the vessel space unoccupied by the water.

GEORGE N. WASHBURN.

References Cited in the file of this patent

UNITED STATES PATENTS

| Number | Name | Date |
|---|---|---|
| 1,405,775 | Friedrichs | Feb. 7, 1922 |
| 2,245,495 | Pemble | June 10, 1941 |
| 2,302,336 | MacDonald | Nov. 17, 1942 |
| 2,563,364 | Proctor | Aug. 7, 1951 |